Sept. 20, 1971  R. R. REAY  3,606,457
PASSENGER RESTRAINT DEVICE
Filed Sept. 5, 1969
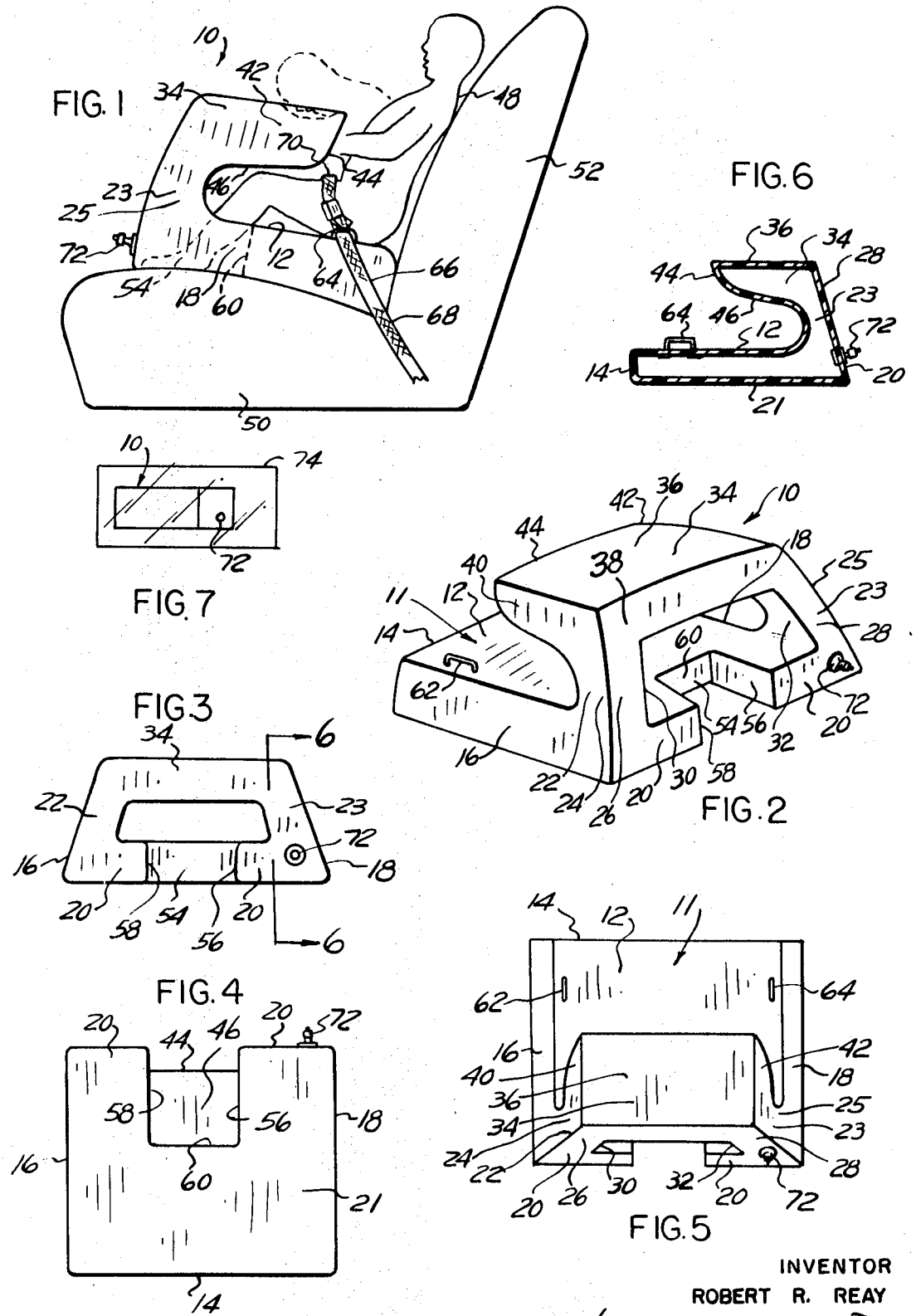
INVENTOR
ROBERT R. REAY
BY Hauke, Gifford & Patalidi
ATTORNEYS

United States Patent Office 3,606,457
Patented Sept. 20, 1971

3,606,457
PASSENGER RESTRAINT DEVICE
Robert R. Reay, Grosse Pointe Woods, Mich., assignor to International Engineering Service, Inc., Birmingham, Mich.
Filed Sept. 5, 1969, Ser. No. 855,555
Int. Cl. B60r 21/10
U.S. Cl. 297—390                            8 Claims

ABSTRACT OF THE DISCLOSURE

An inflatable passenger restraint device for restraining an occupant of a vehicle seat during sudden deceleration of the vehicle including a seat member for positioning beneath the passenger, a pair of side members extending upwardly from the seat member and a shield joining the upper ends of the side members and located in front of a portion of the upper torso of the seated passenger. A pair of loops are formed on the lateral edges of the seat member for threading a conventional vehicle lap belt therethrough, holding the device and the seated passenger in position.

BACKGROUND OF THE INVENTION

(1) Field of the invention

This invention relates to safety devices for restraining vehicle passengers and more particularly to a restraining device which is inflatable and encircles a portion of the body of a seated passenger.

(2) Description of the prior art

Various types of inflatable passenger restraining devices have been designed for restraining the passenger in his seated position during rapid deceleration of the motor vehicle. One such device is shown in U.S. Patent No. 3,265,438, issued Aug. 9, 1966. This patent discloses a passenger restraining device having opposite side portions, a back seat portion and a seat portion, each of which is inflatable and resiliently yieldable. When the restraining device is placed on a conventional car seat and a child seated therein, a conventional lap safety belt may be placed around the device and the child maintaining the child and the device in position.

This restraint device has the disadvantage of not providing a portion across the front of the seated passenger. Upon rapid deceleration of the motor vehicle the seated passenger will be thrown forward bending about the waist, resulting in the upper torso of the passenger striking the lower parts of his body or portions of the vehicle interior structure.

SUMMARY OF THE INVENTION

A safety device for restraining vehicle passengers constructed in accordance with this invention is adapted for use with a forward facing seat of a motor vehicle for protecting a seated passenger against injury during a period of sudden deceleration of the vehicle. This device comprises a seat member adapted to rest on the horizontal seat cushion of the vehicle seat. The seat member has a rear panel adapted to bear on the upright seat back of the vehicle seat. A pair of side members extending upward from the forward portion of the lateral edges of the seat member are connected at their upper ends by a generally horizontal shield forming an enclosure partially surrounding the lower torso of a seated passenger. The shield is located in front of a portion of the upper torso of the seated passenger. A pair of loops are provided on opposite lateral edges of the seat member for receiving a conventional lap belt therethrough. The belt is buckled around the waist of the seated passenger, preventing forward movement of the restraining device and the passenger during sudden vehicle deceleration. The shield provides a cushion for the upper torso of the seated passenger during sudden vehicle deceleration.

DESCRIPTION OF THE DRAWINGS

The description refers to the accompanying drawings wherein like reference characters refers to like parts throughout the several views and in which:

FIG. 1 is a side elevation view of an example of the inflated passenger restraining safety device according to the present invention, as used to restrain a passenger seated in a motor vehicle;

FIG. 2 is a perspective view of the passenger restraining device in the inflated condition;

FIG. 3 is a front view of the restraining device;

FIG. 4 is a bottom view of the restraining device;

FIG. 5 is a top view of the restraining device;

FIG. 6 is a sectional view taken along line 6—6 of FIG. 3; and

FIG. 7 is a plan view of the restraining device in the deflated condition and placed in a bag for storage.

DETAILED DESCRIPTION OF THE PREFERRED EMBODIMENTS

Referring now in detail to the drawings and in particular to FIGS. 1 and 2, numeral 10 denotes generally the inflated passenger restraining device. Although the device is illustrated as being a single member formed from sheet material, such as pliable thin sheets of plastic, and heat sealed along the seams, it readily may be appreciated that the device may be made of a hollow molded unitary structure from rubber or pliable plastic or formed from a plurality of inflatable members connected together in the configuration as shown.

As illustrated in FIGS. 2–6, the device 10 includes a base member 11 having a top panel 12, a rear panel 14, lateral side panels 16 and 18, a pair of front panels 20 and a bottom panel 21. A pair of pillars 22 and 23 are formed from side portions 24 and 25 integral with the side panels 16 and 18 and extending upright and slightly inward from the forward section of the panels 16 and 18. A pair of front portions 26 and 28 integral with the front panels 20 extend upward to form a part of the pillars 22 and 23. Inner portions 30 and 32 extend upward from the front of top panel 12 to form the rest of the pillars 22 and 23.

A substantially horizontal inflated shield 34, supported by the upper ends of the pillars 22 and 23, is spatially disposed from the base member 11, forming an opening at the forward end of the device 10 for the legs of the passenger. The shield 34 includes a top panel 36, a front panel 38 extending between and integral with the upper ends of the front portion 26 and 28, a pair of side panels 40 and 42 integral with the upper ends of side portions 24 and 25 and extending rearward therefrom, a rear portion 44 extending downward from the rear edge of top panel 36 and a bottom portion 46 integral with the rear portion 44 and extending forward therefrom to form the bottom of the shield 34.

FIG. 1 illustrates the use of the restraining device 10 shown in FIG. 2 to restrain a vehicle passenger 48 seated upon the device. The device 10 is located within a vehicle passenger compartment having a forward facing vehicle passenger seat, with a substantially horizontal seat cushion 50 and a substantially vertical seat back 52. The passenger 48 is preferably a child, although it readily may be appreciated that the device may be constructed to any desired dimensions so that vehicle passengers of all sizes may utilize such devices.

As shown in FIG. 1, the bottom panel 21 of the seat member 11, rests upon the top of the horizontal seat cushion 50 with the passenger 48 seated upon the top panel 12 of the seat member 11. The rear panel 14 of the base 11 bears against the lower portion of a vertical seat back 52, with the upper portion of the vertical seat back 52 supporting the back of the passenger 48. The pillars 22 and 23 extend upward from the front of the seat member 11 with the shield 34 extending between the top of the pillars 22 and 23 to form an enclosure around the legs of the passenger 48. The base 11 is formed with a rectangular slot 54 having two side panels 56 and 58, extending rearward from the front panels 20, and a rear panel 60, as best seen in FIGS. 2–5.

As illustrated in FIG. 1, the rectangular slot 54 allows the lower portion of the legs of the passenger 48 to extend downwardly, providing a more comfortable seating arrangement.

A pair of loops 62 and 64 are attached to the top panel 12 at opposite lateral edges thereof and slightly forward of the rear panel 14. A conventional vehicle lap belt 66 is threaded through the loops 62 and 64 and buckled around the waist of the passenger 48, rigidly securing the device 10 and the passenger 48 in the position illustrated in FIG. 1. Such a belt comprises a pair of belt segments 68 and 70, each of which have one end anchored to the floor of the vehicle and the other end carrying a cooperating buckling means.

With the device 10 positioned as illustrated in FIG. 1, it may be observed that the shield 34 extends back from the front of the device 10 towards the passenger 48. Thus, a portion of the shield 34 is located in front of a portion of the upper torso of the passenger 48.

During rapid deceleration or a crash condition of the vehicle, there is a tendency for the vehicle passenger 48 and the restraining device 10 to move forward from the position illustrated in FIG. 2. Due to the presence of the belt 66, the restraining device 10 and the lower torso of the body of the passenger 44 are held in place as illustrated. During rapid deceleration or the crash condition, the upper portion of the passenger 48 moves in a forward direction bending the passenger about the waist. As the upper torso of the passenger 48 moves forward, the chest and stomach of the passenger contact rear portion 44, resulting in the portion 44 being pushed forward. As the portion 44 is pushed forward the kinetic energy of the passenger is gradually absorbed, resulting in the gradual slowing of the forward motion of the passenger. As the upper torso of the passenger 48 moves forward, the head of the passenger engages the top panel 36 of the shield 34, resulting in the panel 36 being pushed downward, as is shown in dotted lines in FIG. 1. As the panel 36 is pushed downward, the shield 34 is wedged between the head and the upper portion of the legs of the passenger, providing a soft cushion for stopping the forward and downward motion of the head of the passenger. Therefore, the shield 34 provides a soft cushion for absorbing the kinetic energy of the uper torso of the passenger 48, preventing injury which would otherwise result by the upper torso striking the lower portion of the body of the passenger.

The restraining device 10 is provided with an air valve 72 mounted in the front panel 20 of the base 11 for inflating nad deflating the device 10. As illustrated in FIG. 7, the device 10 may be deflated and placed in a plastic storage bag 74.

Having thus described the invention by way of typical examples of application thereof, what is sought to be protected by United States Letters Patent is as follows:

1. An inflatable restraint device for a motor vehicle passenger, comprising:

an inflated base member for positioning beneath the vehicle passenger; and a substantially horizontal shield supported from said base member said shield having its upper surface disposed in front of a portion of the upper torso of the passenger, and the lower surface of said shield disposed above and proximate to the knees of said passenger.

2. The invention as defined in claim 1, wherein said base member and said shield comprises a single piece construction formed from sheet material.

3. The invention as defined in claim 2, including: an air valve disposed in said sheet material for inflating and deflating said restraint device.

4. The invention as defined in claim 1, wherein said shield includes a pair of side members extending upwardly from opposite lateral sides of said base member and a generally horizontal connecting panel joining the upper ends of said side members and located in front of a portion of the upper torso of the passenger.

5. The invention as defined in claim 1, including: a pair of loops formed on opposite lateral sides of said base member for receiving a lap safety belt therethrough to prevent forward movement of said restraint device during sudden deceleration of the motor vehicle.

6. The invention as defined in claim 1, wherein said base member and said shield comprise a single piece construction formed from sheet material; said shield includes a pair of side members extending upwardly from opposite lateral sides of said base member and a generally horizontal connecting panel joining the upper ends of said side members; said connecting panel being formed with a generally horizontal section extending toward the passenger for cushioning the upper torso of the passenger as the upper torso is thrown forward by rapid deceleration of the vehicle; and a pair of loops formed on opposite lateral sides of said base member for receiving a lap safety belt therethrough.

7. An inflatable passenger restraint device for use by a vehicle with a forward facing vehicle seat, comprising:

an inflated base member adapted to support a seated vehicle passenger above the horizontal seat cushion of a vehicle seat, said base member having a rear panel adapted to bear on the upright seat back of a vehicle seat;

a pair of upwardly extending and rearwardly inclined side members connected to the forward ends of opposite lateral sides of said base member; and a generally horizontal inflated shield joining the upper ends of said side members to form a four sided enclosure surrounding a portion of the lower torso of a seated vehicle passenger, said shield being located in front of a portion of the upper torso of a seated passenger.

8. The invention as defined in claim 7, including a pair of loops formed along opposite lateral sides of said base member for receiving a safety belt therethrough for preventing forward movement of said restaint device during sudden deceleration of the motor vehicle.

References Cited

UNITED STATES PATENTS 3,265,438    8/1966    Regan et al. _____ 297—380
3,424,497    1/1969    Brilmyer et al. _____ 297—390

JAMES C. MITCHELL, Primary Examiner

U.S. Cl. X.R.

297—216, 170, 174, Digest-3